United States Patent
Ohtsuka et al.

(10) Patent No.: US 7,342,678 B2
(45) Date of Patent: Mar. 11, 2008

(54) PRINT ORDER RECEPTION SYSTEM

(75) Inventors: Shuichi Ohtsuka, Kanagawa-ken (JP); Nobuyoshi Nakajima, Kanagawa-ken (JP); Norihisa Haneda, Saitama-ken (JP); Kazuo Shiota, Tokyo (JP); Shinji Itoh, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 102 days.

(21) Appl. No.: 10/840,285

(22) Filed: May 7, 2004

(65) Prior Publication Data

US 2004/0252578 A1   Dec. 16, 2004

Related U.S. Application Data

(62) Division of application No. 09/065,569, filed on Apr. 24, 1998, now Pat. No. 6,788,425.

(30) Foreign Application Priority Data

Apr. 24, 1997 (JP) .................................. 9-107145
Apr. 17, 1998 (JP) .................................. 10-107707

(51) Int. Cl.
    *G06K 15/00* (2006.01)
(52) U.S. Cl. .................... 358/1.15; 358/1.9; 358/2.1
(58) Field of Classification Search ............... 358/1.15, 358/1.13, 1.14, 527, 302, 1.9, 2.1, 468
    See application file for complete search history.

(56) References Cited

U.S. PATENT DOCUMENTS

| | | | |
|---|---|---|---|
| 4,466,065 A | 8/1984 | Advani et al. | |
| 5,113,351 A | 5/1992 | Bostic | |
| 5,428,423 A * | 6/1995 | Clark | 355/77 |
| 5,574,533 A * | 11/1996 | Itoh | 396/639 |
| 5,666,215 A | 9/1997 | Fredlund et al. | |
| 5,737,491 A | 4/1998 | Allen et al. | |
| 5,821,523 A | 10/1998 | Bunte et al. | |
| 5,828,461 A | 10/1998 | Kubo et al. | |
| 5,907,391 A | 5/1999 | Kobayashi et al. | |
| 5,930,810 A | 7/1999 | Farros et al. | |
| 5,963,641 A | 10/1999 | Crandall et al. | |
| 6,017,157 A | 1/2000 | Garfinkle et al. | |
| 6,018,397 A * | 1/2000 | Cloutier et al. | 358/1.1 |
| 6,788,425 B1 | 9/2004 | Ohtsuka et al. | |

FOREIGN PATENT DOCUMENTS

JP   11-102035 A   4/1999

* cited by examiner

*Primary Examiner*—Jerome Grant, II
(74) *Attorney, Agent, or Firm*—Birch, Stewart, Kolasch & Birch, LLP

(57) ABSTRACT

A print order reception system for receiving an order for print services is provided with a recording medium reception port for receiving a recording medium on which image data of pictures and print order information including printing conditions for pictures to be printed are recorded in the form of electronic data in a predetermined format. A display system reads out from the recording medium received in the recording medium reception port the image data on the pictures to be printed and the print order information on the pictures to be printed and displays the image data and the print order information as an image.

6 Claims, 6 Drawing Sheets

FIG.2

NUMBER OF PRINTS : 5

PRINT SIZE: C

POST-PROCESSING: POSTCARD

SYNTHESIS TEMPLATE ID: FUJI0012.TEN

PIXEL:1000×1500

IMAGE 1: IMAGE001.JPG

AFFINE TRANSFORMATION PARAMETERS: a,b,c,d,e,f ·····

TONE CONVERSION PARAMETERS: x,y,z ·····

COLOR CONVERSION PARAMETERS: r,g,b ·····

.
    .
    .

CLIP ART 1: CRIP0012.FPX

CLIP ART 1 POSITION: x,y,z ·····

CLIP ART AFFINE TRANSFORMATION PARAMETERS: a,b,c,d,e,f ·····

FIG.4
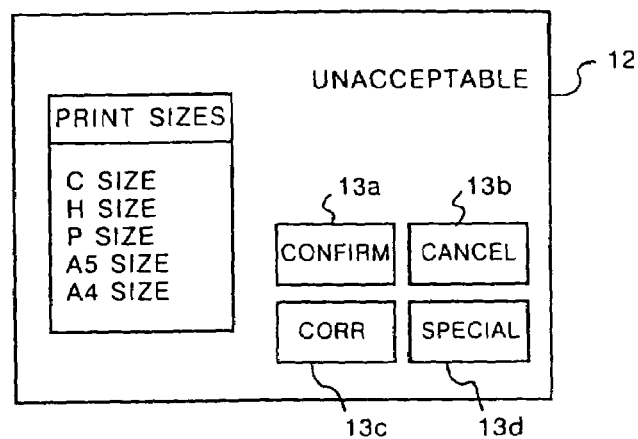
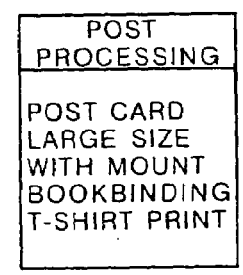
FIG.5A
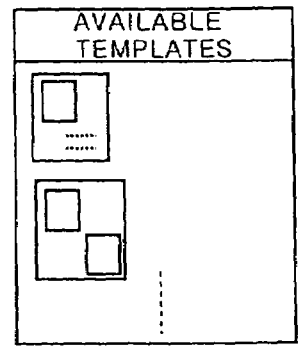
FIG.5B
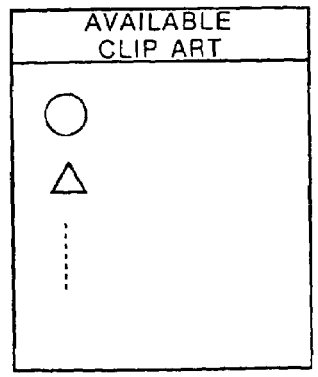
FIG.5C

FIG.9
NAME:
NO.: FUJI010025
DATE: 1997.3.21 16:35
SYSTEM NO.: ODAWARA1125
PRINTS: 35
FINISH: 1997.3.23
ORDER 1
   SIZE C
                       3
ORDER 2
   SIZE A4
                       10
ORDER 3
   SIZE C
                       7
．
．
．

PRINT ORDER RECEPTION SYSTEM

This application is a divisional application of prior application Ser. No. 09/065,569 filed Apr. 24, 1998, which has issued as U.S. Pat. No. 6,788,425 on Sep. 7, 2004, the entirety of which are hereby incorporated by reference.

BACKGROUND OF THE INVENTION

1. Field of the Invention

This invention relates to a print order reception system for receiving an order for photographic prints on the basis of information recorded on a recording medium in a predetermined electronic data format.

2. Description of the Related Art

There has been proposed a system of ordering photographic prints in which the contents of the order, e.g., the number of prints, print size and the like, are directed in the form of information recorded on a recording medium in a predetermined electronic data format instead of an oral order at a photo processing shop or a laboratory. This system enables the photofinishing system to read the information on the order and to execute the order without operator's manual input of the contents of the order.

In the system, the information on the order must be recorded in a predetermined data format that is acceptable to the photofinishing system. Accordingly, application software for easily making information on the order is provided on a screen of a personal computer to the customers. The software displays a table of print services, the charges for the services and the like so that the customer can designate the pictures to be printed, the number of prints and the like. Referring to the table, the application software formats information on the order in a predetermined data format on the basis of designation by the customer.

Therefore, using the application software, the customer selects desired print services from those displayed on the screen, thereby generating information on an order for the print services (will be referred to "print order information" hereinbelow) and carries a recording medium on which the print order information is recorded together with the image data to a photo processing shop.

However, since the print order information is recorded in the form of a digital data on a recording medium such as MO, ZIP, FD or the like in the form of digital data, the customer cannot confirm the contents of the order recorded on the recording medium when he or she actually makes the order. Accordingly, he or she can make a wrong order without recognizing mistake in making the print order information or without recognizing the he or she brings a wrong recording medium. Further when an idea for changing the order occurs to the customer, he or she has to go home to remake the print order information.

SUMMARY OF THE INVENTION

In view of the foregoing observations and description, the primary object of the present invention is to provide a print order reception system in which the customer can confirm the contents of the print order information when making an order for prints.

In accordance with the present invention, there is provided a print order reception system for receiving an order for print services comprising a recording medium reception port for receiving a recording medium on which image data of pictures and print order information including printing conditions for pictures to be printed are recorded in the form of electronic data in a predetermined format, and a display means which reads out from the recording medium received in the recording medium reception port the image data on the pictures to be printed and the print order information on the pictures to be printed and displays the image data and the print order information as an image.

The "print order information recorded in the form of electronic data in a predetermined format" is, for instance, an order file in IS (Image Shuttle) format.

The "print services" include, for instance, reprinting, making postcards, making calendars and the like, and the "printing conditions" include, for instance, print sizes (standard size, L size, A4 calendar size, A3 calendar size and etc.), the kind of illustration and/or characters to be combined with the picture, finish (e.g., luster) and the like. The contents of the print services and the printing conditions are included in the print order information.

The "recording medium" is a medium for transfer of image data between customers and photographic services stations such as a photo processing shop, a convenience store and the like, where the print order reception system of the present invention is installed. For example, the recording medium may be a magnetic recording medium or an optical recording medium such as MO, Zip, FD and the like. The image data of pictures and the print order information may be recorded on separate recording media. For example, the image data may be recorded on a CD-R with the print order information recorded on a FD.

The recording medium reception port is a port through which the recording medium is loaded and a plurality of such recording medium reception ports may be provided to conform to different types of recording media.

It is preferred that the print order reception system be provided with a control means through which instruction of confirmation of the order for prints or instruction of cancel of the order can be input. Such a control means may be, for instance, a press button, a keyboard or a touch panel.

Further it is preferred that the print order reception system be provided with a reception end means which moves the recording medium to a predetermined storage position or a return port after displaying the image data and the print order information as an image.

The recording medium reception port may double as the return port. That is, the recording medium may be loaded through the recording medium reception port and returned through the same. The expression "after displaying the image data and the print order information as an image" means after the customer confirms the contents of the order viewing the image, and means after the customer inputs instruction of confirmation of the order for prints, instruction of correction of the order or instruction of cancel of the order through the control means when the print order reception system is provided with the control means.

Further, since in the photofinishing system, the print sizes and the print papers to be acceptable differ depending on the performance of the printer connected, it is important to determine whether it is possible to execute the order upon reception of the order. Accordingly, it is preferred that the print order reception system be provided with a judging means for judging whether the printing conditions are acceptable.

Preferably, the printing conditions should include information on the layout condition of the images on a print paper and information on the aspect ratio of the print paper to be used.

The "layout condition" means, for instance, the range of cut of a picture when the picture and the print paper on which the picture is printed are different in aspect ratio, layout of pictures on a print paper when a plurality of pictures are to be printed on one sheet of print paper, and layout of characters and templates when characters and templates are used.

Further, it is preferred that the print order reception system be provided with a correction input means for inputting correction of the print order information, and a corrected print order information making means which corrects the print order information on the basis of the corrected input through the correction input means and creates corrected print order information.

The correction input means may comprise, for instance, a push button, a keyboard or a touch panel.

Preferably, the corrected print order information making means is a means for adding or correcting the layout condition and more preferably a means which is able to lay out an additional image such as characters, templates and clip arts on the print paper in addition to the picture to be printed.

Further it is preferred that the print order reception system be provided with a second recording medium for recording the image data together with the print order information as recorded on said recording medium or the corrected print order information created by the corrected print order information making means. Preferably the second recording medium is a removable medium such as MO, Zip, FD or the like. The second recording medium need not be provided on the print order reception system itself but may be a recording medium which is connected to the print order reception system through a network or the like, e.g., a hard disc of a printer connected to the print order reception system through a network.

Further it is preferred that the print order reception system is provided with a printer which prints out the contents of the print order information as recorded on said recording medium and/or the corrected print order information.

The output of the printer may be used as a copy for the customer or may be attached to an order bag.

In the print order reception system of the present invention, the customer can confirm the contents of the order recorded on the recording medium before he or she actually makes the order through the image displayed. Accordingly he or she is prevented from making a wrong order without recognizing mistake in making the print order information or without recognizing that he or she brings a wrong recording medium.

When said control means is provided, confirmation or cancel of the order can be effected on the spot.

When said reception end means is provided, the customer can easily know that the reception processing is completed through movement of the recording medium to the predetermined storage position or the return port.

When the print order reception system is provided with said judging means, it can be judged whether it is possible to execute the order by the photofinishing system upon reception of the order. When it is determined that the order cannot be executed by the photofinishing system, display to that effect may be made or the recording medium may be ejected. Accordingly the customer can avoid an accident of sending the recording medium to a laboratory where the order cannot be executed and at the same time, the customer can change the contents of the order to be acceptable to the photofinishing system on the spot if desired.

When the print order reception system is provided with said correction input means and the corrected print order information making means, the customer can change or correct the contents of the print order information.

When the print order reception system is provided with said second recording medium, the recording medium which the customer brings can be returned on the spot.

When the print order reception system is provided with the printer which prints out the contents of the print order information, the output of the printer may be used as a copy for the customer or may be attached to an order bag. By attaching the output of the printer to the order bag, it is possible to check whether the finished prints satisfy the customer's order without opening the print order information file.

BRIEF DESCRIPTION OF THE DRAWINGS

FIG. 2 is a view showing an example of contents of print order information, FIG. 4 is a view of the monitor on which the processing control frame and the correction input frame are displayed, FIGS. 5A to 5C are views showing examples of the correction input frame, FIG. 9 is a view showing an example of the contents of the copy output from the printer.

DESCRIPTION OF THE PREFERRED EMBODIMENT

Figure 1:
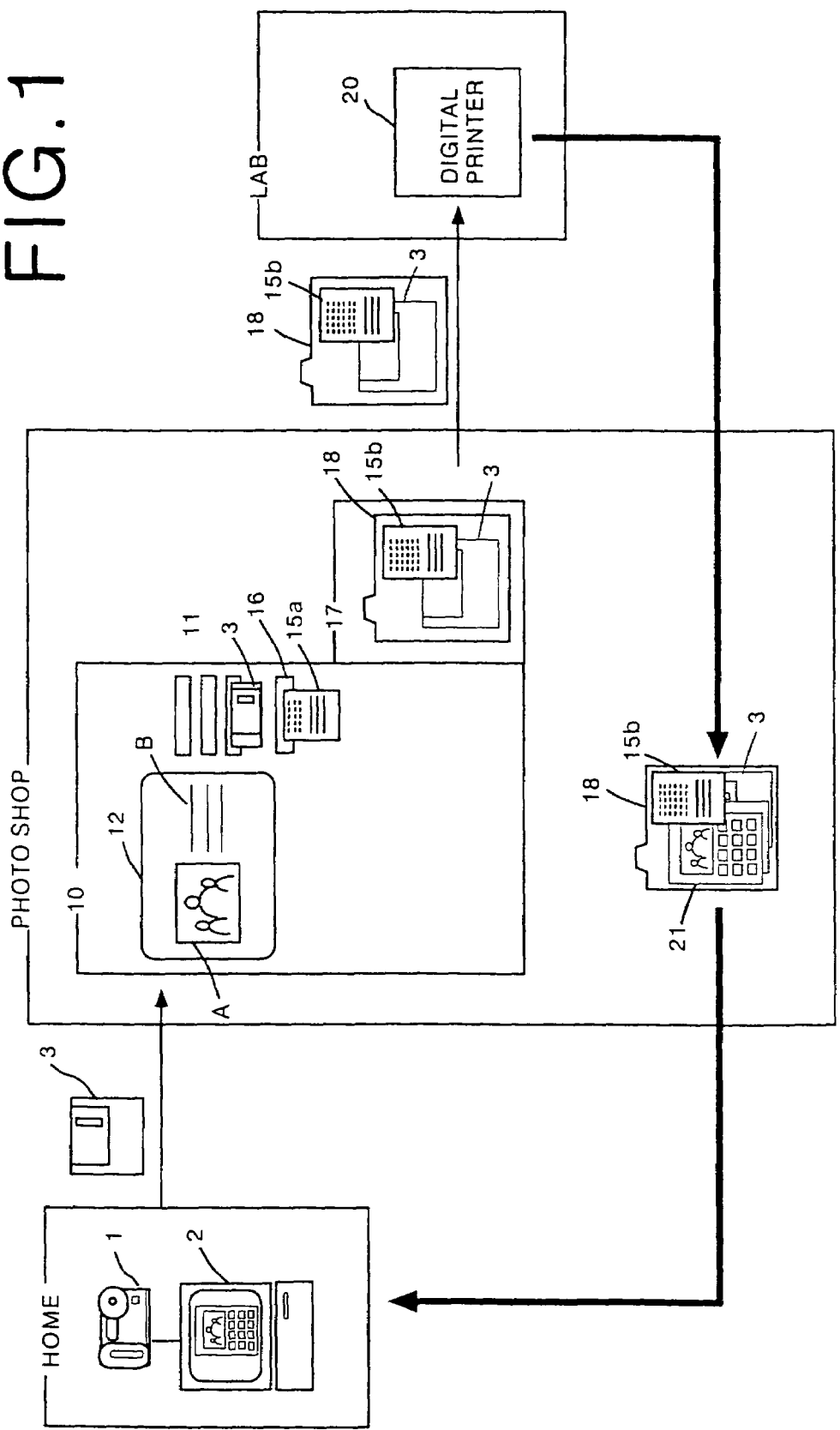
FIG. 1 is a schematic view showing a photofinishing system in which a print order reception system is employed in accordance with an embodiment of the present invention.

FIG. 1 shows a flow of image data, prints or the like in a customer's home, a photo processing shop and a laboratory. As in the conventional photographic prints using photographic film, customers visit a photo processing shop, make an order for photographic prints and receive finished photographic prints afterward.

A print order reception system 10 in accordance with an embodiment of the present invention comprises a plurality of recording medium reception ports 11 for receiving a recording medium 3 on which image data of pictures and print order information have been recorded by the customer. The recording medium 3 may be a MO, a Zip or the like and the recording medium 3 is loaded through one of the recording medium reception ports 11 according to the kind of the recording medium 3. The print order reception system 10 is further provided with a monitor 12 which reads out from the recording medium 3 received in the recording medium reception port 11 the image data on the pictures to be printed and the print order information on the pictures to be printed and displays the image A and the print order information B, a printer (to be described later) which prints out the contents of the print order information (e.g., the printing conditions), a copy discharge port 16 through which a copy 15a of the contents of the print order information output from the printer is discharged, a storage location 17 in which the recording medium 3 is stored after reception thereof is finished. The copy 15a is kept by the customer. In this particular embodiment, the print order information includes information on order such as the name of the customer, the number of prints, payment condition and the destination and, printing conditions such as the print size, information on synthesis of a plurality of images, parameters for affine transformation when an image is rotated or translated, parameters for converting tone and/or hue o fan image, an image of template to be used, an image of a clip art to be used, information on back print and information on characters to be printed, as shown in FIG. 2.

The monitor 12 displays not only the image A and the print order information B but also a processing control frame for making confirmation, cancel and the like of the contents of the order and a correction input frame for making a correction of the print order information, as will be described later. In the processing control frame and the correction input frame, buttons in the form of a touch panel are displayed. The customer can make an order for prints on the self-service basis by touching the buttons to communicate with the print order reception system 10.

The customer visits, for instance, a photo processing shop with a recording medium 3 on which print order information created by use of a personal computer 2 and image data are recorded, and makes a print order through the print order reception system 10. The recording medium 3 is put in an order bag 18 and stored in the storage location 17 after reception of the order by the print order reception system 10. The recording medium 3 in the order bag 18 is sent to the laboratory, and the images are printed out by the printer 20 according to the printing conditions designated by the print order information. The finished photographic prints 21 are put in the order bag 18 together with the recording medium 3 and sent back to the photo processing shop. The customer receives the prints 21 and the recording medium 3 at the photo processing shop.

Figure 3:
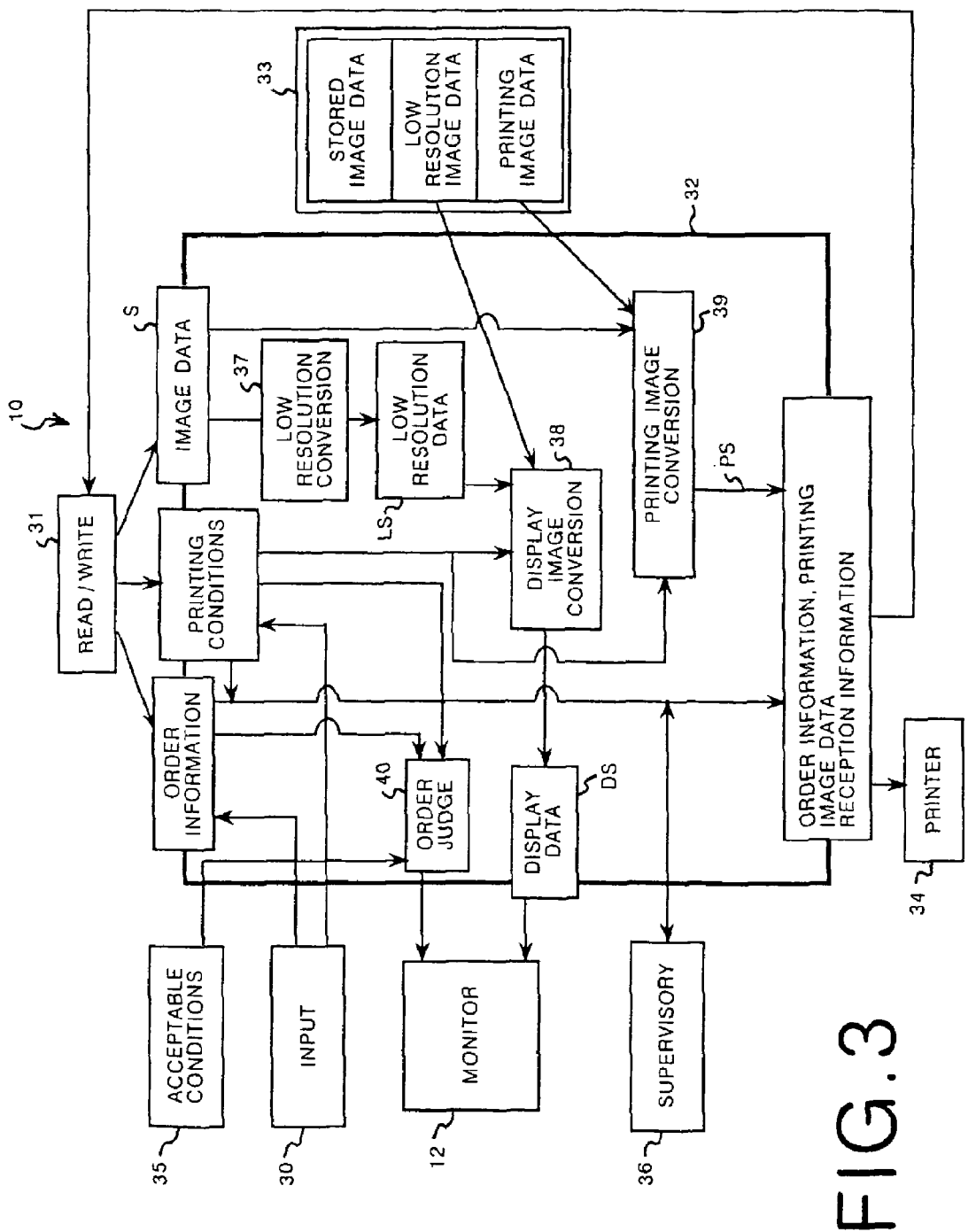
FIG. 3 is a block diagram showing the arrangement of the print order reception system and the flow of data in the print order reception system.

As shown in FIG. 3, the print order reception system 10 comprises an input means 30 (consisting of the processing control frame and the correction input frame displayed on the monitor 12 in this particular embodiment) through which the customer inputs instruction on correction of the print order information and the like, a read/write means 31 which reads out the print order information and the image data S to be printed from the recording medium 3 and writes necessary data on the recording medium 3, an image processing means 32 which processes the image data S according to the image data S and the print order information read out by the read/write means 31 and corrects the print order information as directed by the customer, an image data storage means 33 which stores image data for retention such as templates, clip arts and the like which are used on the basis of print order information and low-resolution or high resolution image data corresponding to the image data S recorded on the recording medium 3 are recorded, a printer 34 which prints out the contents of the print order information, an acceptable printing condition recording means 35 on which data on acceptable printing conditions which can be executed by the laboratory are recorded, and a supervisory means 36 which supervises the data such as the print order information received by the print order reception system 10 of this embodiment.

The image processing means 32 comprises a low resolution image conversion section 37 which converts the image data S read out by the read/write means 31 to a low resolution image data LS to make it feasible to display an image on the monitor 12, a displaying image conversion section 38 which converts the low resolution image data LS to a displaying image data DS so that an image processed according to the printing conditions can be displayed on the monitor 12, a printing image conversion section 39 which converts the image data S to a printing image data PS, on the basis of which prints are output, according to print order information finally determined as will be described later, and an order judging section 40 which judges whether the customer's order represented by the print order information read out by the read/write means 31 can be executed by the laboratory referring to the data on the acceptable printing conditions recorded on the acceptable printing condition recording means 35.

The image data f or retention stored in the image data storage means 33 are high resolution image data to be used for printing when the image data of templates or the like, which has been provided to the customers, are for display and of low resolution, or the print order information includes only a number for designating a template or the like. Low resolution image data for display corresponding to the high resolution image data are also stored in the image data storage means 33.

The data on the acceptable printing conditions include, for instance, sizes of prints, kinds of postcards, kinds of post-processing prints such as bookbinding of an album, kinds of templates and or clip arts which acceptable to the laboratory.

Reception of an order for photographic prints will be described hereinbelow.

Preparation of print order information by the customer will be first described. The customer views or edits pictures reproduced by a personal computer 2 on the basis of digital image data S which are input from a digital camera or digital image data S read out from a photographic film and stored in a CD, MO or the like. When the customer wants to print such pictures, the customer makes print order information including printing conditions for the pictures to be printed, which information is recorded in the form of electronic data in a predetermined format. Here it is assumed that the customer's personal computer 2 is installed with viewer software for viewing pictures, edit software for editing the pictures, and order processing software for making the print order information.

The order processing software is a program which causes the computer to make print order information in the form of electronic data in a predetermined format acceptable to the photofinishing system to be used. For example, the electronic data is recorded in a format defined by an IS standard, which defines the format of order files for transmitting print order information from customers to laboratories as well as disc arrangement (format, structure of directories and the like), gradation and/or data format necessary for maintaining image quality, structure of the image file, contents of the record format. Conversion software is provided for converting image data in a format for BMP, JPEG, TIFF, photo CD or the like to a file according to the IS standard together with the print order information. Of course, the print order information may be in any format other than that of the IS standard, so long as the format is acceptable to the photofinishing system.

The customer records the print order information thus prepared on the recording medium 3 (which may, for instance a MO) together with the image data S and visits the photo processing shop with the recording medium 3. The print order reception system 10 is installed at the photo processing shop and the customer makes an order for photographic prints in the self-service basis.

When the customer loads the recording medium 3 in a predetermined one of the recording medium reception ports 11 of the print order reception system 10, reception processing is initiated. The read/write means 31 of the print order reception system 10 reads out from the recording medium 3 the print order information and the image data S on the pictures to be printed. The print order information read out is input into the order judging section 40. The order judging section 40 judges whether the customer's order represented by the print order information can be executed by the laboratory referring to the data on the acceptable printing conditions recorded on the acceptable printing condition recording means 35. For example, when the print order information includes an order for prints of A3 size whereas the print size acceptable to the laboratory is up to A4 size, the order judging section 40 judges that the order is not acceptable and that effect is displayed on the monitor 12 as shown in FIG. 4. At this time, the processing control frame including a confirmation button 13*a*, a cancel button 13*b*, a correction button 13*c* and a special button 13*d* is displayed on the monitor 12. When it is determined that the order is acceptable, the next processing is executed.

Referring to the display on the monitor 12, the customer touches the cancel button 13*b* to cancel the order or the correction button 13*c* to correct the contents of the order. When the customer touches the cancel button 13*b*, the recording medium 3 is discharged from the recording medium reception port 11 and the reception processing is interrupted. When the customer touches the correction button 13*c*, the correction input frame including the data on acceptable printing conditions that can be executed by the laboratory is displayed on the monitor 12. At this time, when the print order information includes an order for prints of an unacceptable size, a list of acceptable sizes is displayed on the monitor 12, as shown in FIG. 4. When the print order information includes an order for an unacceptable post-processing print, an unacceptable template or an unacceptable clip arts, a list of acceptable post-processing prints, templates or clip arts is displayed, as shown in FIGS. 5A to 5C. When the customer touches selected one of the acceptable sizes, post-processing prints, templates or clip arts, the print order reception system 10 creates new print order information according to the selection of the customer.

When the print order information includes no unacceptable printing condition or when new print order information properly corrected is created, the image data S read out is input into the low resolution image conversion section 37 and is converted to a low resolution image data LS. The low resolution data LS are input into the displaying image conversion section 38. When the print order information instructs use of image data for retention, the low resolution image data for display out of the image data for retention stored in the image data storage means 33 are also input into the displaying image conversion section 38. The image data for retention are those such as template images, clip art images and the like which are to be combined with the images of the customers and are stored in the image data storage means 33 as described above. The template images and the like are of a plurality of kinds and the high resolution image data for printing of the template images and the like are large in volume. Accordingly, in order to provide the high resolution image data to the customers, a bulk recording medium is required and it takes a long time to transfer the high resolution image data to the customers through a network. Accordingly, by storing the high resolution image data of the template images and the like and providing only the low resolution image data of the template images or the like or only the numbers for designating the template images or the like to the customers, the customers can use the template images and the like by use of the low resolution image data or the numbers, without necessity for the customers to store the high resolution image data. Further, with this arrangement, the template images and the like which are to be protected under copyright are prevented from being used without permission.

The low resolution image data LS or the low resolution image data for retention input to the displaying image conversion section 38 are converted to a displaying image data DS so that an image processed according to the printing conditions can be displayed on the monitor 12. The displaying image data DS represent an image which is equivalent to an image to be actually printed in whether white edging exists or not, cut of the image, combination of images, combination with a template and the like. An image A reproduced on the basis of the displaying image data DS is displayed on the monitor 12 together with the print order information. Examples of such display are shown in FIGS. 6 to 8.

Figure 6:
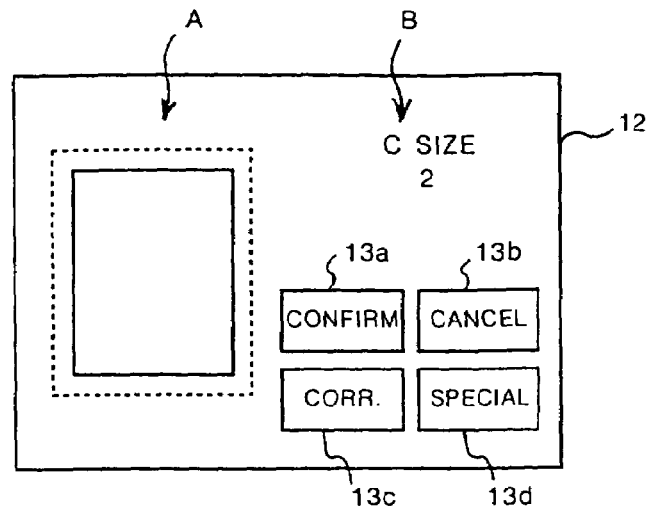
FIGS. 6 to 8 are views showing examples of frames in which the images to be printed and the print order information for the images are displayed.

FIG. 6 shows a frame which is displayed when a pair of C size prints are to be output on the basis of the displaying image data DS. As shown in FIG. 6, the image A and "C size" and "two" are displayed on the monitor 12. On the monitor 12, the size of the image as represented by the image data S is shown by the dashed line and the size of the print is shown by the solid line. Accordingly the portion of the image which is to be cut from the original image when printed can be easily known. Further, the processing control frame including a confirmation button 13*a*, a cancel button 13*b*, a correction button 13*c* and a special button 13*d* is displayed on the monitor 12. The special button 13*d* is for effecting a special processing such as correction of color, a processing for avoiding red-eye effect, insertion of characters, insertion of clip arts and the like.

Figure 7:
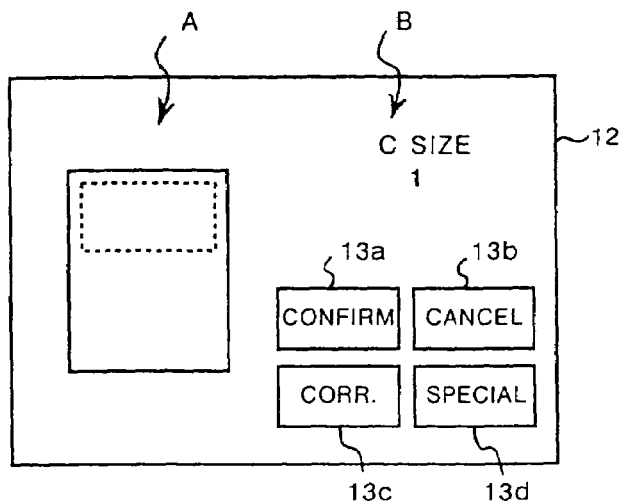

FIG. 7 shows a frame which is displayed when the image represented by the image data S is to be contacted or trimmed and printed on one sheet of C size print paper. As shown in FIG. 7, the image A and "C size" and "one" are displayed on the monitor 12. On the monitor 12, the size of the image as represented by the image data S is shown by the dashed line and the size of the print is shown by the solid line. Accordingly the state of the blank on the actual print can be easily known.

Figure 8:
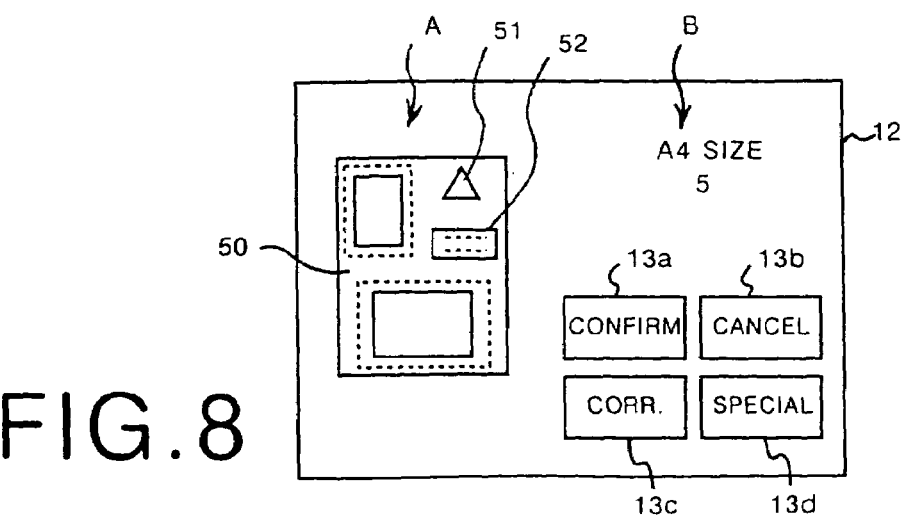

FIG. 8 shows a frame which is displayed when the image represented by the image data S is to be combined with a template, a clip art and characters and the combined image is to be printed on five sheets of A4 size print paper. As shown in FIG. 8, the image A and "A4 size" and "five" are displayed on the monitor 12. The image A includes the template 50, the clip art 51 and the characters 52 to be combined with the image. The templates has a pair of image display windows in which images are displayed. On the monitor 12, the size of the image as represented by the image data S is shown by the dashed line and the sizes of the image display windows of the template 50 is shown by the solid line. Accordingly the state of actual print can be easily known.

The images to be printed and the print order information for the respective images may be displayed either one by one or in groups of a predetermined number.

The customer confirms the contents of the order referring to the display on the monitor 12 and selects one of the confirmation button 13*a*, the cancel button 13*b*, the correction button 13*c* and the special button 13*d*.

(1) When the Confirmation Button 13*a* is Selected:

When there remains some images the confirmation processing on which has not been carried out, the confirmation processing is continued until the processing is completed on all the images. Thereafter the next processing is executed.

(2) When the Cancel Button 13b is Selected:

When there remains some images the confirmation processing on which has not been carried out, the confirmation processing is continued until the processing is completed on all the images. When the cancel button 13b is selected for all the images, the print order reception system 10 returns the recording medium 3 through the recording medium reception port 11.

(3) When the Correction Button 13c or the Special Button 13d is Selected:

A correction input frame shown in FIG. 4, 5A, 5B or 5C is displayed on the monitor, and the customer inputs correction through the correction input frame. For example, when the image data S is too large relative to the size of the print paper and it is expected that a part of the image is cut unless some printing condition is corrected, the customer inputs correction for reducing the size of the image(s), changing the layout, rotating the image(s) and/or reducing the number of the images to be printed on one sheet of print paper. Further as a special processing, the customer may input correction for correcting a mistake in characters, inserting a clip art, changing the combination of the image(s) and a template, changing color and/or avoiding red-eye effect. The print order reception system 10 creates new print order information according to the correction and/or the special processing input by the customer, converts the image data S to displaying image data DS according to the new print order information and displays an image on the basis of the displaying image data DS. The customer repeats the procedure described above on the basis of the image displayed.

When the aforesaid processing is completed on all the images, the printing image conversion section 39 converts the image data S to printing image data PS on the basis of the final print order information. At this time, when the final print order information includes combination of the image with a template or a clip art stored in the print order reception system 10, the printing image conversion section 39 creates the printing image data PS using the high resolution image data on the template or the clip art which are stored in the image data storage means 33. Then the printing image data PS and the final print order information are recorded on the recording medium 3 loaded in the recording medium reception port 11. Further the order reception information (e.g., the number of reception, the date of reception, the number of the print order reception system, the name of the photo processing shop or the like, the expected date of delivery) issued from the supervisory means 36 is recorded on the recording medium 3.

After the printing image data PS and the final print order information are thus recorded on the recording medium 3, the print order reception system 10 causes the printer 34 to print out the contents of the order, and a copy 15a of the contents of the order is discharged from the copy discharge port 16. FIG. 9 shows an example of the copy 15a. As shown in FIG. 9, the name of the customer, the number of reception, the date of reception, the number of the print order reception system, the number of prints, the expected date of delivery, the print order information, thumbnail images representing the pictures to be printed and the like are recorded on the copy 15a. Only a desired part of these data may be printed. The customer keeps the copy 15a and uses it as an exchange ticket. Another copy 15b of the contents of the order is attached to an order bag 18 and the order bag 18 containing therein the recording medium 3 is moved to the storage location 17.

The recording media 3 stored in the storage location 17 are sent to a laboratory contained in the order bags 18. In the laboratory, the image data of the pictures to be printed are processed according to the respective printing conditions and prints 21 are output. The finished photographic prints 21 and the recording medium 3 are put in the order bag 18 and delivered to the photo processing shop.

The customer receives the finished photographic prints 21 and the recording medium 3 at the photo processing shop where he or she made the order. It is possible to designate upon making the order a different photo processing shop for the place where the customer receives the finished photographic prints 21 and the recording medium 3.

The print order reception system of the present invention can be applied also to pictures taken by use of photographic film. In such a case, the pictures are read by use of a scanner at a laboratory or the like and digital image signals representing the pictures are stored in a recording medium such as CD, MO or Zip.

It is possible to provide the print order reception system with a money entry port so that the customer can pay upon making the order. In this case, it is preferred that whether the account has been paid be recorded on the copies 15a and 15b.

Image data of relatively low resolution for edit are sometimes provided to the customers instead of high resolution image data for printing. In such a case, the high resolution image data corresponding to the low resolution image provided to the customers are stored in the image data storage means 33 in the print order reception system 10 together with the image data for retention. The customer edits the images by use of the low resolution image data and loads in the print order reception system 10 the recording medium 3 on which the edited image data and print order information are recorded. The print order reception system 10 reads out the high resolution image data corresponding to the low resolution image data from the image data storage means 33 and generates printing image data PS by use of the high resolution image data. The printing image data PS thus prepared are recorded on the recording medium 3 and sent to the laboratory as in the preceding embodiment.

Though in the embodiment described above, the recording medium 3 on which the printing image data PS and the final print order information are recorded is transferred to the laboratory, the printing image data PS and the final print order information may be recorded on a bulk recording media such as MO, CD-R or Zip provided on the print order reception system and the bulk recording media may be sent to the laboratory. With this arrangement, the recording medium 3 can be returned to the customer on the spot after reception of the order is finished.

Further the printing image data PS and the final print order information may be transferred to the laboratory through a data transfer system comprising a network, a modem and the like. Also with this arrangement, the recording medium 3 can be returned to the customer on the spot after reception of the order is finished. Further the time required to send the recording medium 3 to the laboratory can be saved and the customer can get the prints in a shorter time.

Further by connecting a printer to the print order reception system 10, the images can be printed out on the spot.

Further though, in the embodiment described above, the processing control frame and the correction input frame are displayed on the monitor 12, they may be displayed on a touch panel provided on the print order reception system 10 separately from the monitor 12. Further other input means such as a keyboard or push buttons may be used in place of the touch panels.

What is claimed is:

1. A print system wherein at least one photofinishing system exists and the at least one photofinishing system has varied printing parameters, which the at least one photofinishing system is capable of performing, and a print order reception unit associated with the at least one photofinishing system, the print order reception unit containing a record of print parameters related to acceptable print parameters of the at least one photofinishing system, said print system comprising:

a software system configured to allow a user to select printing conditions for image data and save the image data and the print conditions on a removable recording medium; and a print order reception unit associated with the at least one photofinishing system and configured to allow the user to confirm that the at least one photofinishing system may process image data according to the user selected print conditions and to allow the user to make a print order for the at least one photofinishing system, wherein the print order reception unit includes a processor configured to compare the user selected print conditions with the acceptable print parameters of the at least one photofinishing system and a display configured to notify the user as to whether or not the user selected print conditions are within the acceptable print parameters of the at least one photofinishing system, and wherein if the user selected print conditions are not within the acceptable print parameters of the at least one photofinishing system, the user via the display is permitted to select a second processing condition that is within the acceptable print parameters of the at least one photofinishing system.

2. The print system of claim 1, wherein the print order reception unit further comprises:

a storage unit configured to store the acceptable print parameters of the at least one photofinishing system.

3. The print system as defined in claim 2, wherein printing services provided by the print system include at least one of reprinting, printing postcards and printing calendars.

4. The print system as defined in claim 3, wherein the acceptable print parameters include at least one of print sizes, type of illustration and/or characters to be combined with pictures related to the image data, and luster.

5. The print system as defined in claim 1, wherein the user selected print conditions include at least one of print sizes, type of illustration and/or characters to be combined with pictures related to the image data, and luster.

6. The print system as defined in claim 1, wherein the print order reception unit is located at the at least one photofinishing system.

* * * * *